United States Patent
Hübner et al.

(10) Patent No.: US 6,872,464 B2
(45) Date of Patent: Mar. 29, 2005

(54) SOLDERING AGENT FOR USE IN DIFFUSION SOLDERING PROCESSES, AND METHOD FOR PRODUCING SOLDERED JOINTS USING THE SOLDERING AGENT

(75) Inventors: Holger Hübner, Baldham (DE); Vaidyanathan Kripesh, Singapore (SG)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/384,311

(22) Filed: Mar. 7, 2003

(65) Prior Publication Data

US 2004/0025976 A1 Feb. 12, 2004

Related U.S. Application Data

(63) Continuation of application No. PCT/DE00/03103, filed on Sep. 7, 2000.

(51) Int. Cl.[7] .......................... B23K 35/26; C22C 13/00
(52) U.S. Cl. ...................... 428/548; 428/553; 428/557; 428/560; 428/564; 228/193
(58) Field of Search ................................ 428/548, 553, 428/557, 560, 564; 228/193

(56) References Cited

U.S. PATENT DOCUMENTS

| | | | |
|---|---|---|---|
| 3,839,780 A | | 10/1974 | Freedman et al. |
| 5,053,195 A | | 10/1991 | MacKay |
| 5,922,397 A | * | 7/1999 | Brandt et al. ................. 427/98 |
| 6,027,575 A | | 2/2000 | Paruchuri et al. |
| 6,120,885 A | * | 9/2000 | Call et al. ................... 428/209 |

FOREIGN PATENT DOCUMENTS

| | | |
|---|---|---|
| DE | 1 153 226 | 8/1963 |
| DE | 1 168 745 | 4/1964 |
| DE | 1 483 436 | 3/1969 |
| DE | 1 508 356 | 1/1970 |
| DE | 3740733 * | 6/1989 |
| DE | 43 34 438 A1 | 4/1995 |
| DE | 195 32 251 A1 | 3/1997 |
| DE | 297 16 141 U1 | 3/1999 |
| FR | 2 706 139 A1 | 12/1994 |
| WO | WO 96/19314 | 6/1996 |

OTHER PUBLICATIONS

Nakao, Y. et al.: "Diffusionslöten von Nickelbasissuperlegierungen über temporäre diffusionsgesteuerte Flüssigphasen" [Diffusion–Soldering of Nickel Based Super Alloys over Temporary Diffusion–Controlled Liquid Phases], Schweissen und Schneiden, No. 44, Issue 2, 1992, pp. 87–92.

Chang, H. et al.: "Electroless Silver Plating of Oxide Particles in Aqueous Solution", Journal of Materials Science, No. 28, 1993, pp. 5207–5210.

* cited by examiner

*Primary Examiner*—Deborah Jones
*Assistant Examiner*—Jason L Savage
(74) *Attorney, Agent, or Firm*—Laurence A. Greenberg; Werner H. Stemer; Ralph E. Locher

(57) ABSTRACT

A soldering agent for use in diffusion soldering processes contains, in a soldering paste, a mixture of at least partially metallic grains of a high-melting metal and a solder metal. In a diffusion soldering process, the solder metal reacts completely with the high-melting metal and metals belonging to parts that are to be joined to one another by the soldering process, to form an intermetallic phase.

20 Claims, 1 Drawing Sheet

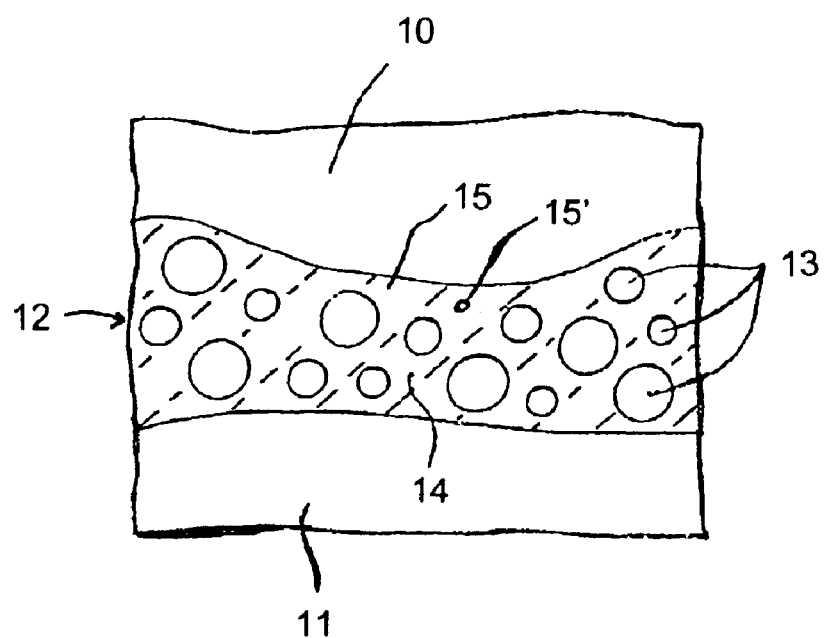

ABSTRACT# SOLDERING AGENT FOR USE IN DIFFUSION SOLDERING PROCESSES, AND METHOD FOR PRODUCING SOLDERED JOINTS USING THE SOLDERING AGENT

CROSS-REFERENCE TO RELATED APPLICATION

This application is a continuation of copending International Application No. PCT/DE00/03103, filed Sep. 7, 2000, which designated the United States and was not published in English.

BACKGROUND OF THE INVENTION

Field of the Invention

The present invention relates to a soldering agent for use in diffusion soldering processes for producing soldered joints between metal parts, for example soldered joints between metal parts of electronic circuit systems and substrates. The soldering agent is formed of a solder metal or a solder metal alloy and a metal with a melting point that is higher than the melting point of the solder metal or solder metal alloy. The solder metal or solder metal alloy, the metal in the parts which are to be joined to one another, and the metal with the high melting point form an intermetallic phase during the soldering process. The invention further relates to a method for producing the soldered joints.

Diffusion soldering processes can generally be used to produce soldered joints between metal parts, in particular including for producing soldered joints between electronic circuit systems and substrates.

In the context of the present invention, the term electronic circuit systems is to be understood as meaning solid-state circuit systems, in particular integrated semiconductor circuits. In particular, the term system, for example in the case of an integrated semiconductor circuit, is intended to mean the semiconductor material body which includes the electronic functional circuit elements, such as transistors, diodes, capacitors, etc., as well as the metallic interconnects and connection elements which are situated thereon and connect the functional circuit elements. The connection elements may, inter alia, be large areas of metal, known as pads.

In the context of the present invention, the term substrates is understood as meaning circuit boards, such as printed circuits or printed-circuit boards. Substrates of this type likewise have connection elements of the type described above, likewise in the form of pads.

Examples of soldering agents for diffusion soldering processes are known from U.S. Pat. No. 5,053,195. These are amalgams of a liquid metal or a liquid metal alloy and a metal powder, if appropriate with solid or volatile additives. It can also be seen from the U.S. patent cited that amalgams of this type are advantageously suitable for permanent connection of electronic and microelectronic systems. Cited examples of liquid metals or metal alloys which are solders are gallium, indium, gallium/tin, gallium/indium and gallium/indium/tin, and metal powders cited are antimony, cobalt, copper, chromium, germanium, gold, iron, nickel, magnesium, manganese, platinum, silver and vanadium.

For a diffusion-soldering process, it is characteristic that a low-melting solder produces a metallic joint which is able to withstand high temperatures through the fact that the solder metal forms a temperature-resistant and highly mechanically stable intermetallic phase with high-melting metals which are to be joined. In the process, the low-melting solder is completely transformed, i.e. it passes completely into the metallic phase. The process is diffusion-controlled and its duration increases as the thickness of the solder metal layer rises. For a typical solder metal layer thickness of 2 µm, the transformation process lasts a few minutes.

Since the high mechanical stability of intermetallic phases of the above-mentioned type is based on their low elastic deformability, the solder seam rapidly becomes brittle as its thickness increases. Therefore, in diffusion processes the solder seam width has to be very small, typically less than 10 µm.

To ensure that the condition of solder seams of a small width is satisfied, it is necessary for the parts which are to be joined to have very planar and smooth surfaces. Although this is often the case in microelectronics, in other applications, for example including in power electronics, the surfaces either do not sufficiently match one another or are significantly rougher, and consequently the low solder seam widths cannot be achieved.

Therefore, despite their mechanical advantages, diffusion soldering processes are no longer practical for relatively high solder seam widths.

It is known from 1996 the reference titled "Electronic Components and Technology Conference", pp. 565–570, to use an electrically conductive adhesive material, which contains a filler powder which is coated with a metal with a low melting point (solder metal), a thermoplastic polymer and further small amounts of organic additives, to join objects, such as semiconductor circuits and printed circuits. In this case, the filler powder in the form of grains is coated with solder metal which, during a soldering process, in order to form a joint between the objects, is melted in order to produce a metallurgical joint between adjacent filler grains and between filler grains and connection elements on the objects to be used. The adhesive in the form of the thermoplastic polymer is used to produce a mechanical joint between the objects. However, adhesives of this type are not sufficiently temperature-stable, have only a low ability to withstand mechanical loads, are moisture-sensitive, have a poor thermal conductivity and are not electrically optimal. Furthermore, in the case of joining seams of a great thickness between objects which are to be joined to one another, segregation of the components of the electrically conductive adhesive material may occur, for example on account of non-planar surfaces, and this has a further adverse effect on the electrical conductivity. The above-mentioned problem of the brittleness of intermetallic phases of considerable thickness also continues to cause disruption.

SUMMARY OF THE INVENTION

It is accordingly an object of the invention to provide a soldering agent for use in diffusion soldering processes, and a method for producing soldered joints using the soldering agent that overcome the above-mentioned disadvantages of the prior art devices and methods of this general type, which are suitable even for large solder seam widths, in particular of more than 10 µm up to a few hundred µm, and ensure simple, mechanically stable soldered joints which are able to withstand external reagents and have good thermal and electrical conductivities.

With the foregoing and other objects in view there is provided, in accordance with the invention, a soldering agent for use in a diffusion-soldering process for producing soldered joints between metal parts. The soldering agent contains a solder material formed of a solder metal or a solder metal alloy. A metal having a higher melting point than a melting point of the solder material is provided. The solder material, a metal in the metal parts to be joined to one another, and part of the metal with the higher melting point form an intermetallic phase during the diffusion-soldering process. The metal with the higher melting point and the solder material being present in a quantitative ratio such that in the diffusion-soldering process the solder material and the metal with the higher melting point merge into the intermetallic phase, in such a manner that the solder material reacts completely, to form the intermetallic phase with a thickness predetermined by an elastic deformability of the solder material. The metal with the higher melting point being retained in a quantity such that, in a soldered joint formed between the metal parts, a completely metallic electrically conductive solder seam is formed, and a maximum thickness of the intermetallic phase between retained parts of the metal with the higher melting point is defined by the metal with the higher melting point.

The core of the invention is to be considered to reside in the fact that, with the soldering agent that contains only a solder metal or a solder metal alloy and a metal with a melting point which is high compared to that of the solder metal or solder metal alloy, purely by the quantitative ratio of these components, in a diffusion soldering process the thickness of intermetallic phases which form in the process remains sufficiently low for the elastic deformability thereof to remain ensured while, at the same time, a completely metal-filled solder seam is formed. In this context, the term "thickness of the intermetallic phase" is to be understood as meaning that the maximum wall thickness of a foam structure that it forms is such that the cavities in this structure are filled with metal of a high melting point, i.e. the thickness is defined by the metal of high melting point. The term "only" in the present context means that the finished solder seam no longer contains any components that have an adverse effect on the electrical, mechanical and/or thermal properties of the metal/intermetallic phase system. Examples of such components may be soldering pastes or fluxes that escape during the soldering process.

Other features which are considered as characteristic for the invention are set forth in the appended claims.

Although the invention is illustrated and described herein as embodied in a soldering agent for use in diffusion soldering processes, and a method for producing soldered joints using the soldering agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic, sectional view depicting a solder seam produced by a soldering agent between two parts that are to be joined according to the invention.

DESCRIPTION OF THE PREFERRED EMBODIMENTS

Referring now to the single FIGURE of the drawing in detail, reference numerals 10 and 11 denote two parts, which are illustrated in cut-away form and have been joined to one another by a solder seam 12. The solder seam 12 has been produced by a diffusion soldering process from a soldering agent according to the invention. Since this is intended to be a joint between the two metallic parts 10, 11 over a relatively large solder seam, unevenness on opposite surfaces of the parts 10 and 11 are illustrated diagrammatically in curved form.

In a soldering paste, which is not independently illustrated, the soldering agent according to the invention contains a solder metal or solder metal alloy 15 and grains 13 which at least in part are formed of a metal with a melting point which is high compared to the melting point of the solder metal or solder metal alloy 15.

According to one embodiment of the invention, the grains 13 may be solid-metal grains, or according to a further embodiment of the invention the grains 13 may be insulating cores that are coated with a metal. In the latter case, a substance selected from the group consisting of silicon, ceramic, glass or polymers can be used as material for the insulating cores.

Where the grains 13 are in the form of insulating cores covered with a metal, they can be produced, for example, as described in the reference titled "Journal Of Materials Science" 28 (1993), pp. 5207–5210, for electroless deposition of silver on oxide cores.

In a particular configuration of the invention, the at least partially metallic grains 13 may have a diameter of the order of magnitude of at least 50 to 100 nm, and specifically of the order of magnitude of 5 to 100 $\mu$m.

According to one embodiment of the invention, the solder metal or solder metal alloy 15 can be provided as a coating on the at least partially metallic grains 13, or according to a further embodiment, the solder metal or solder metal alloy 15 may be present in the form of grains 15' in the soldering paste together with the grains 13. In the latter case, the grains 15' of the solder metal or the solder metal alloy have a smaller diameter than the at least partially metallic grains 13.

According to a particular embodiment of the invention, a metal selected from the group consisting of mercury, gallium, indium, tin, lead, bismuth or alloys thereof is used as the solder metal or solder metal alloy, and a metal selected from the group consisting of gold, silver, copper and nickel is suitable as a metal with a melting point of the grains 13 which is high compared to that of the solder metal or solder metal alloy 15, and also as the metal of the parts 10 and 11 which are to be joined.

In the case of grains 13 which are in the form of solid-metal grains, by way of example tin as solder metal can be electrolessly deposited, in a layer thickness of the order of magnitude of 200 nm, on grains of copper. In this case, some of the copper at the surface of the grains is replaced by tin in the form of an exchange bath. The procedure can also be similar if the grains 13 are insulating cores covered with a metal, for example silver, in which case, by way of example, tin is deposited electrolessly on the silver coating.

According to a preferred embodiment of the invention, the at least partially metallic grains 13 may have different diameters, as illustrated in the FIGURE of the drawing. In this way, it is possible to achieve a maximum density of the filling of the solder seam 12.

According to a further embodiment of the invention, it is also possible to provide a combination of cores 13 that are covered with the solder metal or a solder metal alloy and grains 13 that do not have a covering, i.e. cores that at least in part are formed only of a metal with a high melting point.

In addition to the solder metal or solder metal alloy 15 and the at least partially metallic grains 13, the soldering paste may additionally contain a wetting liquid which escapes from the solder seam 12 during the soldering process, a flux which prevents the oxidation of metal surfaces or a filler which fills cavities between the grains 13. In this way, it is also possible to produce properties in the solder seam 12 which differ from the mechanical and electrical properties of an intermetallic phase, for example a defined thermal expansion, a low thermal conductivity or a high level of acoustic damping. Additive components of this type can readily be provided in such a form that they do not have any effect on the desired properties of the metal/intermetallic phase system.

According to the inventive method for producing soldered joints using soldering agents of the embodiments described above, the soldering paste is applied to the parts 10 and 11 which are to be joined, after which they are put together and the soldering agent is heated to above the melting point of the solder metal or solder metal alloy but not above the melting point of the metal of the parts 10 and 11 which are to be joined and of the grains 13. In the process, the liquid solder metal or the liquid solder metal alloy reacts with the metal of the grains 13 and the parts which are to be joined, so as to form an intermetallic phase 14, which is indicated by dashed lines in the FIGURE, and at the same time to form a consolidation, during which the entire quantity of solder material is consumed.

The invention ensures that the thickness of the intermetallic phase 14 which forms a foam structure is created in such a way that its wall thickness between the grains 13 remains so small that, as explained above, the elastic deformability results. The cavities in the foam structure are filled by the metal with the high melting point, i.e. the thickness or wall thickness is defined by the metal. It should be noted that the packing density of the grains 13 in the FIGURE, for reasons of clarity, is shown to be lower than is actually the case in the solder seam 12 that is produced in accordance with the invention. It should also be noted that the term "thickness or wall thickness" does not refer to the total thickness of the solder seam 12.

The soldering agent according to the invention and the method according to the invention offer the advantage that the entire solder seam of even great width is completely filled by the metal/intermetallic phase system without the intermetallic phase 14 itself being more than a few $\mu$m thick anywhere. The cavities of the structure are filled by the at least partially metallic grains 13 and if appropriate also by additional fillers.

In addition to the mechanically stable joint between the parts 10 and 11, which is able to withstand external reagents, the at least partially metallic cores 13 and the intermetallic phase 14 are also able to produce a joint of good electrical and thermal conductivity between the parts 10 and 11.

We claim:

1. A soldering agent for use in a diffusion-soldering process for producing soldered joints between metal parts, the soldering agent comprising:
   a solder material selected from the group consisting of a solder metal and a solder metal alloy; and
   a metal having a higher melting point than a melting point of said solder material, said solder material, a metal in the metal parts to be joined to one another, and part of said metal with said higher melting point forming an intermetallic phase during the diffusion-soldering process, said metal with said higher melting point and said solder material being present in a quantitative ratio such that in the diffusion-soldering process said solder material and said metal with said higher melting point merge into said intermetallic phase, in such a manner that said solder material reacts completely, to form said intermetallic phase with a thickness predetermined by an elastic deformability of said solder material, said metal with said higher melting point being retained in a quantity such that; in a soldered joint formed between the metal parts, a completely metallic electrically conductive solder seam being formed, and a maximum thickness of said intermetallic phase between retained parts of said metal with said higher melting point is defined by said metal with said higher melting point.

2. The soldering agent according to claim 1, wherein said metal with said higher melting point contains grains which are at least partially metallic grains.

3. The soldering agent according to claim 2, wherein said at least partially metallic grains are solid-metal grains.

4. The soldering agent according to claim 2, wherein said at least partially metallic grains are formed of insulating cores covered with a metal.

5. The soldering agent according to claim 4, wherein said insulating cores are formed of a substance selected from the group consisting of silicon, ceramic, glass and polymers.

6. The soldering agent according to claim 2, wherein said at least partially metallic grains have different diameters.

7. The soldering agent according to claim 2, wherein said solder material is disposed as a coating on said at least partially metallic grains.

8. The soldering agent according to claim 1, wherein said soldering material is provided in a form of grains in a soldering paste.

9. The soldering agent according to claim 2, wherein said at least partially metallic grains include grains coated with said soldering material and grains which are not coated.

10. The soldering agent according to claim 1, wherein said metal having said higher melting point is selected from the group consisting of gold, silver, copper and nickel.

11. The soldering agent according to claim 1, wherein said solder material is selected from the group consisting of mercury, gallium, indium, tin, lead, bismuth and alloys thereof.

12. The soldering agent according to claim 1, wherein said metal with said higher melting point is copper and said solder metal used is tin.

13. The soldering agent according to claim 1, wherein said metal with said higher melting point is silver and said solder metal is tin.

14. The soldering agent according to claim 2, wherein said at least partially metallic grains have a diameter of an order of magnitude of at least 50 to 100 nm.

15. The soldering agent according to claim 2, wherein said at least partially metallic grains have a diameter of an order of magnitude of 5 to 100 $\mu$m.

16. The soldering agent according to claim 2, wherein said soldering material is disposed as a coating on said at least partially metallic grains and said coating has a layer thickness of an order of magnitude of 200 nm.

17. The soldering agent according to claim 2, further comprising a solder paste which includes said solder material, said at least partially metallic grains, and a liquid solvent able to escape from said completely metallic electrically conductive solder seam during heating as part of the soldering process.

18. The soldering agent according to claim 2, further comprising a soldering paste containing said solder material, said at least partially metallic grains, and a flux.

19. The soldering agent according to claim 2, further comprising a soldering paste containing said solder material, said at least partially metallic grains, and a filler.

20. A method for producing soldered joints, which comprises the steps of:

providing a soldering agent containing:
- a solder material selected from the group consisting of a solder metal and a solder metal alloy; and
- a metal in a form of at least partially metallic grains, the metal having a higher melting point than a melting point of the solder material, the solder material, a metal in the metal parts to be joined to one another, and part of the metal with the higher melting point forming an intermetallic phase during the diffusion-soldering process, the metal with the higher melting point and the solder material being present in a quantitative ratio such that in the diffusion-soldering process the solder material and the metal with the higher melting point merge into the intermetallic phase, in such a manner that the solder material reacts completely, to form the intermetallic phase with a thickness predetermined by an elastic deformability of the solder material, the metal with the higher melting point being retained in a quantity such that, in a soldered joint formed between the metal parts, a completely metallic electrically conductive solder seam being formed, and a maximum thickness of the intermetallic phase between retained parts of the metal with the higher melting point is defined by the metal with the higher melting point;

applying the soldering agent to the metal parts to be joined to one another;

bring the metal parts together; and heating the metal parts to a melting point below a melting point of the metal of the metal parts and of the at least partially metallic grains, until the solder material has fully reacted with the metal with the higher melting point to form the intermetallic phase.

\* \* \* \* \*

UNITED STATES PATENT AND TRADEMARK OFFICE
CERTIFICATE OF CORRECTION

PATENT NO.     : 6,872,464 B2
DATED          : March 29, 2005
INVENTOR(S)    : Holger Huebner et al.

It is certified that error appears in the above-identified patent and that said Letters Patent is hereby corrected as shown below:

Column 6,
Line 9, should read as follows:
-- a quantity such that, in a soldered joint formed between --

Signed and Sealed this

Twelfth Day of July, 2005

JON W. DUDAS
*Director of the United States Patent and Trademark Office*